United States Patent
Hwang

(10) Patent No.: US 7,272,197 B2
(45) Date of Patent: *Sep. 18, 2007

(54) DEVICE FOR RECOVERING CARRIER

(75) Inventor: Yong Suk Hwang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 759 days.

This patent is subject to a terminal disclaimer.

(21) Appl. No.: 10/673,631

(22) Filed: Sep. 30, 2003

(65) Prior Publication Data

US 2004/0136474 A1 Jul. 15, 2004

(30) Foreign Application Priority Data

Oct. 1, 2002 (KR) ........................ 10-2002-0059861

(51) Int. Cl.
*H04L 27/14* (2006.01)
(52) U.S. Cl. .................. 375/326; 375/327; 375/373; 375/322; 455/204
(58) Field of Classification Search .............. 375/326, 375/150, 316, 371, 354, 373, 375, 376
See application file for complete search history.

(56) References Cited

U.S. PATENT DOCUMENTS 4,514,002 A * 4/1985 McIntosh .................. 293/118
5,673,293 A * 9/1997 Scarpa et al. .............. 375/321
5,872,815 A * 2/1999 Strolle et al. .............. 375/321
6,192,088 B1 * 2/2001 Aman et al. ............... 375/326
6,356,598 B1 * 3/2002 Wang ........................ 375/321
6,526,101 B1 * 2/2003 Patel ..................... 375/240.28
6,539,062 B1 * 3/2003 Grabb et al. ............... 375/261
2004/0131132 A1 * 7/2004 Hwang ...................... 375/321

* cited by examiner

*Primary Examiner*—Chieh M. Fan
*Assistant Examiner*—Siu M. Lee
(74) *Attorney, Agent, or Firm*—McKenna Long & Aldridge LLP

(57) ABSTRACT

Device for recovering a carrier including a first signal converter for multiplying a complex carrier caused by a phase error to a digitized passband VSB signal, to provide a baseband VSB signal, a second signal converter for multiplying a complex value of a frequency to the signal from the first signal converter, to convert the baseband VSB signal into an OQAM signal, an error estimating part for generating a signal having carrier phase error information by using a real component and an imaginary component of the OQAM signal, and an oscillator for generating a complex carrier according to the carrier phase error information, thereby making carrier recovery regardless of a pilot component of TV signal, accurately.

22 Claims, 6 Drawing Sheets

(a) VSB  I : ⑪, X1, ⑫, X3, ⑬, X5, ⑭, ⋯
         Q : Q1, X2, Q2, X4, Q3, X6, Q5, ⋯
                        ↓ *exp(jwn)*

(b) OQAM I : ⑪, Y2, Y4, Y5, ⑬, Y8, Y10, ⋯
         Q : Y1, Y3, ⑫, Y6, Y7, Y9, ⑭, ⋯

DEVICE FOR RECOVERING CARRIER

The application claims the benefit of the Korean Application No. P2002-59861 filed on Oct. 1, 2002, which is hereby incorporated by reference.

BACKGROUND OF THE INVENTION

1. Field of the Invention

The present invention relates to digital TV receivers, and more particularly, to a device for recovering a carrier in a VSB system digital TV receiver.

2. Background of the Related Art

The VSB (vestigial sideband) system, employed as Korean and the USA digital TV (DTV) broadcasting standards, is designed to transmit a broadcasting signal by using a frequency allocated for the present analog TV broadcasting. However, for minimizing an influence to the present analog TV broadcasting, the DTV signal is transmitted at a very low intensity compared to the analog TV signal. Of course, the standards are set such that there is no problem in reception of the DTV signal even if the intensity of the signal is low by employing different coding system in the DTV signal and channel equalizers for reducing an influence from noise. However, if a situation of the transmission channel is very poor, the reception of the signal is very poor. In general, since the DTV transmission system has an advantage in that a noise occurred on a transmission channel is removed perfectly at reception of the broadcasting signal, to enable to watch a picture having no noise at all, while the DTV transmission system has a disadvantage in that the picture can not be watched at all if the transmission signal is not recovered fully, it is required that the DTV receiver receives whole signal whatever poor transmission channel the signal has passed.

FIG. 1 illustrates a block diagram of a related art VSB system DTV receiver, wherein, upon reception of a RE (Radio Frequency) signal modulated in a VSB system through an antenna 101, after selecting a particular channel frequency the user desires, a tuner 102 converts the RF band VSB signal carried on the channel frequency into an IF band (Intermediate Frequency band) signal (in general 44 MHz or, in the case of analog TV broadcasting, 43.75 MHz is used widely), and filters out other channel signals, appropriately.

The signal from the tuner 102, which converts a spectrum of channels into an IF pass band signal, passes a SAW (Surface Acoustic Wave) filter 103 employed for removing neighboring channel signals, and the noise signal.

In this instance, since the digital broadcasting signal has all information within a 6 MHz zone centered on, for an example, the IF of 44 MHz the SAW filter 103 removes other zones from the output of the tuner 102, only leaving the 6 MHz zone having the information, and provides to an IF amplifier 104.

The IF amplifier 104 multiplies a gain calculated beforehand to the output from the SAW filter 103 for making an amplitude of the signal from an A/D (analog/digital) converter after the IF amplifier 104 the same always. Accordingly, the A/D converter 105 receives and digitizes signals of the same amplitude from the IF amplifier 104. The passband signal digitized at the A/D converter 105 is transited to a baseband signal at the carrier recoverer 106, and provided to a DC (direct current) remover 107. In this instance, the carrier used in recovering the carrier at the carrier recoverer 106 is turned to a DC component having 0 Hz frequency.

That is, the DC component is forcibly inserted into a transmission signal at a transmitter for the carrier to recoverer to recover the carrier. Therefore, after the carrier recovery is done, the DC component inserted at the transmitter is required no more. According to this, the DC remover 107 detects and removes the DC component from the baseband signal from the carrier recoverer 106.

The baseband digital signal having the DC component removed therefrom is provided both to a synchronizer 108 and a channel equalizer 109.

The most remarkable features of the VSB transmission system suggested by the Grand Alliance (GA) compared to other DTV transmission system are a pilot signal, a data segment synchronizing signal, and a field synchronizing signal. The signals are inserted at the transmitter before transmission for improving characteristics of carrier recovery and timing recovery.

Accordingly, the synchronizer 108 recovers the data segment synchronizing signal, and the field synchronizing signal from the signal inserted at the time of transmission having the DC component removed therefrom. The synchronizing signals obtained thus are provided to the channel equalizer 109, a phase corrector 110, and an FEC (forward error correction) 111.

The channel equalizer 109 removes a linear distortion of an amplitude in the baseband digital signal causing interference between symbols, ghost occurred as the signal is reflected at buildings or mountain, and the like by using the baseband digital signal and the synchronizing signal, and provides to the phase corrector 110.

Referring to FIG. 1, the signal passed through all analog processes is converted into a digital signal at the A/D converter 105 and provided to the carrier recoverer 106. Therefore, all of the digital process blocks after the carrier recoverer 106 can not make regular operation if the carrier recovery is not made at the carrier recoverer 106.

Therefore, the carrier recoverer 106 in the DTV receiver recovers a position of a pilot frequency in a frequency of a transmitted signal, and converts the pilot frequency into a baseband signal.

Presently, as the most general algorithm of the carrier recoverer 106, an FPLL (Frequency Phase Locked Loop) as shown in FIG. 2 is used, which is used widely as the circuit is simple and has good performance. That is, the carrier recoverer 106 of the FPLL demodulates passband I, Q signals from the A/D converter 105 into baseband I, Q signals, and locks frequencies and phases.

Referring to FIG. 2, a real component of a passband signal digitized at the A/D converter 105 is provided both to a delay 201 and a Hilbert transformer 202.

The Hilbert transformer 202 receives, and inverts the real component to 90° to transform the real component into an imaginary component signal, and provides to a complex multiplier 203, and the delay 201 receives and delays a real component of the signal as long as a process time period at the Hilbert transformer 202, and provides to the complex multiplier 203.

For convenience of description, the signal passed through the delay 201 is called as an I channel signal, and the signal passed through the Hilbert transformer 202 is called as a Q channel signal.

The complex multiplier 203 receives a complex carrier having carrier recovery done, i.e., a sine wave and a cosine wave, through an NCO (Numerically Controlled Oscillator) 210, and multiplies to the passband I, Q signals from the A/D converter 105, to transit the passband I, Q signals into baseband I, Q signals.

The baseband I, Q signals are provided to a DC remover 107 and, for recovery of the carrier, the baseband I signal is provided to a first lowpass filter 204, and the baseband Q signal is provided to a second lowpass filter 205.

In this instance, the carrier recoverer 106 requires a signal in the vicinity of frequency having the pilot frequency present therein among the 6 MHz bandwidth of signal. Therefore, the first and second lowpass filters 204 and 205 remove rest of frequency component having a data component therein from the I, Q signals, for preventing a performance of the carrier recoverer from being deteriorated by the data.

The first lowpass filter 204 provides an output to a delay 206. The delay 206 delays the I signal having the data component removed therefrom for a time period and provides to a sign extractor 207. If the I signal of the pilot component from the first lowpass filter 204 fails in conversion into a DC component accurately when the I signal of the pilot component passes through the delay 206, a phase error as much as the failure occurs.

Therefore, the delay 206 receives, and converts a difference of a pilot frequency component of the passband signal and the carrier frequency component of the NCO 210 into a form of a phase error, and provides to a sign extractor 207.

The sign extractor 207 only extracts a sign of the signal from the delay 206, and provides to a multiplier 208. The multiplier 208 multiplies the sign of the I signal and the Q signal having the data component removed therefrom, and provides to a loop filter 209 as a phase error. The loop filter 209 receives, filters, and accumulates the phase error, and provides to the NCO 210, and the NCO 210 generates a complex carrier proportional to an output from the loop filer 209, and provides to the complex multiplier 203.

In this instance, if a frequency of the pilot, a component of a carrier present in a received passband, and a frequency component of a carrier generated at the NCO 210 are identical exactly, the service of the carrier recoverer 106 finishes.

Thus, the pilot frequency, information from the transmitter for carrier recovery, is definite, has little phase jitter that can be taken place in the carrier recovery. However, because the pilot is reduced in a signal received in a channel environment having many reflected waves, such as an environment of a city center, use of the pilot at the carrier recoverer is limited. That is, there can be a case the data component is attenuated depending on a DTV reception channel environment, a case a frequency component in the pilot is attenuated, and, in the worst case, there can be a case the frequency component in the pilot is attenuated fully, such that no pilot component exhibits.

In the case the pilot component is reduced or fails to exhibit, accurate carrier recovery can fails. Moreover, the phase jitter, influenced from noise, becomes heavy following the reduction of the pilot.

SUMMARY OF THE INVENTION

Accordingly, the present invention is directed to a device for recovering a carrier that substantially obviates one or more of the problems due to limitations and disadvantages of the related art.

An object of the present invention is to provide a device for recovering a carrier, in which a VSB signal is converted into a form of OQAM (Offset Quadrature Amplitude Modulation), and estimate a carrier phase error from the OQAM signal.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the device for recovering a carrier includes a first signal converter for multiplying a complex carrier caused by a phase error to a digitized passband VSB signal, to provide a baseband VSB signal, a second signal converter for multiplying a complex value of a frequency to the signal from the first signal converter, to convert the baseband VSB signal into an OQAM signal, an error estimating part for generating a signal having carrier phase error information by using a real component and an imaginary component of the OQAM signal, and an oscillator for generating a complex carrier according to the carrier phase error information.

For generating the signal including the carrier phase error information, the error estimating part multiplies the real component and the imaginary component of the OQAM signal, or respectively squares the real component and the imaginary component of the OQAM signal, and calculates a difference of a squared value of the real component and a squared value of the imaginary component, or calculates absolute values of the real component and the imaginary component of the OQAM signal, and calculates a difference of absolute values of the real component and the imaginary component.

The OQAM signal includes a symbol of the VSB signal in either one of the real component and the imaginary component, or no symbol of the VSB signal in neither of the real component and the imaginary component.

In another aspect of the present invention, there is provided a method for recovering a carrier, including the steps of (a) multiplying a digitized passband VSB signal to a complex carrier caused by a phase error to convert the passband VSB signal into a baseband VSB signal, (b) multiplying a complex value of a frequency to the baseband VSB signal, to convert the baseband VSB signal to an OQAM signal, (c) generating a signal including carrier phase error information by using a real component and an imaginary component of the OQAM signal, and (d) generating a complex carrier according to the carrier phase error information.

In further object of the present invention, there is provided a device for recovering a carrier including a first signal converter for multiplying a complex carrier caused by a phase error to a digitized passband VSB signal, to provide a baseband VSB signal, a second signal converter for multiplying a complex value of a frequency to the signal from the first signal converter, to convert the baseband VSB signal into an OQAM signal, an error estimating part for generating a signal having carrier phase error information by using a real component and an imaginary component of the OQAM signal, a sampling part for sampling a signal from the error estimating part to shift the signal to a DC position, a filter for filtering, and accumulating the signal from the sampling part, and an oscillator for generating a complex carrier according to a signal from the filter.

In still further aspect of the present invention, there is provided a method for recovering a carrier including the steps of (a) multiplying a digitized passband VSB signal to a complex carrier caused by a phase error to convert the passband VSB signal into a baseband VSB signal, (b) multiplying a complex value of a frequency to the baseband VSB signal, to convert the baseband VSB signal to an OQAM, (c) generating a signal including carrier phase error information by using a real component and an imaginary component of the OQAM signal, (d) sampling a frequency component only having the carrier phase error information and shifting to a DC position, and (e) generating a complex carrier according to the sampled frequency component.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

The present invention suggests modulation of a VSB signal into an OQAM (Offset Quadrature Amplitude Modulation) signal, and detecting a carrier phase error by using signals of a real component and an imaginary component having symbols included therein respectively, or having no symbols included therein respectively.

A process for modulating a baseband VSB signal into an OQAM signal will be described with reference to FIG. 3.

Figure 1:
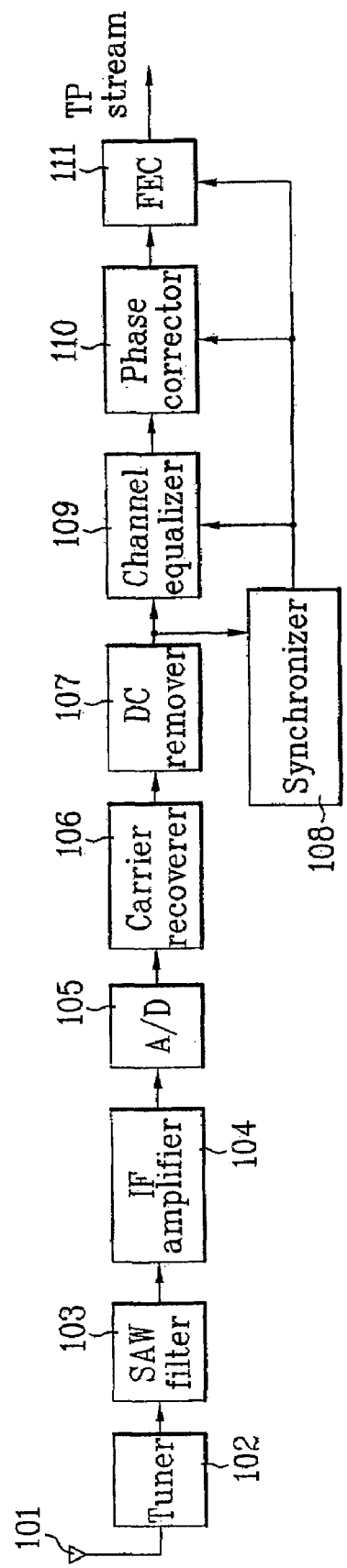
FIG. 1 illustrates a block diagram of a related art digital TV receiver.
Figure 2:
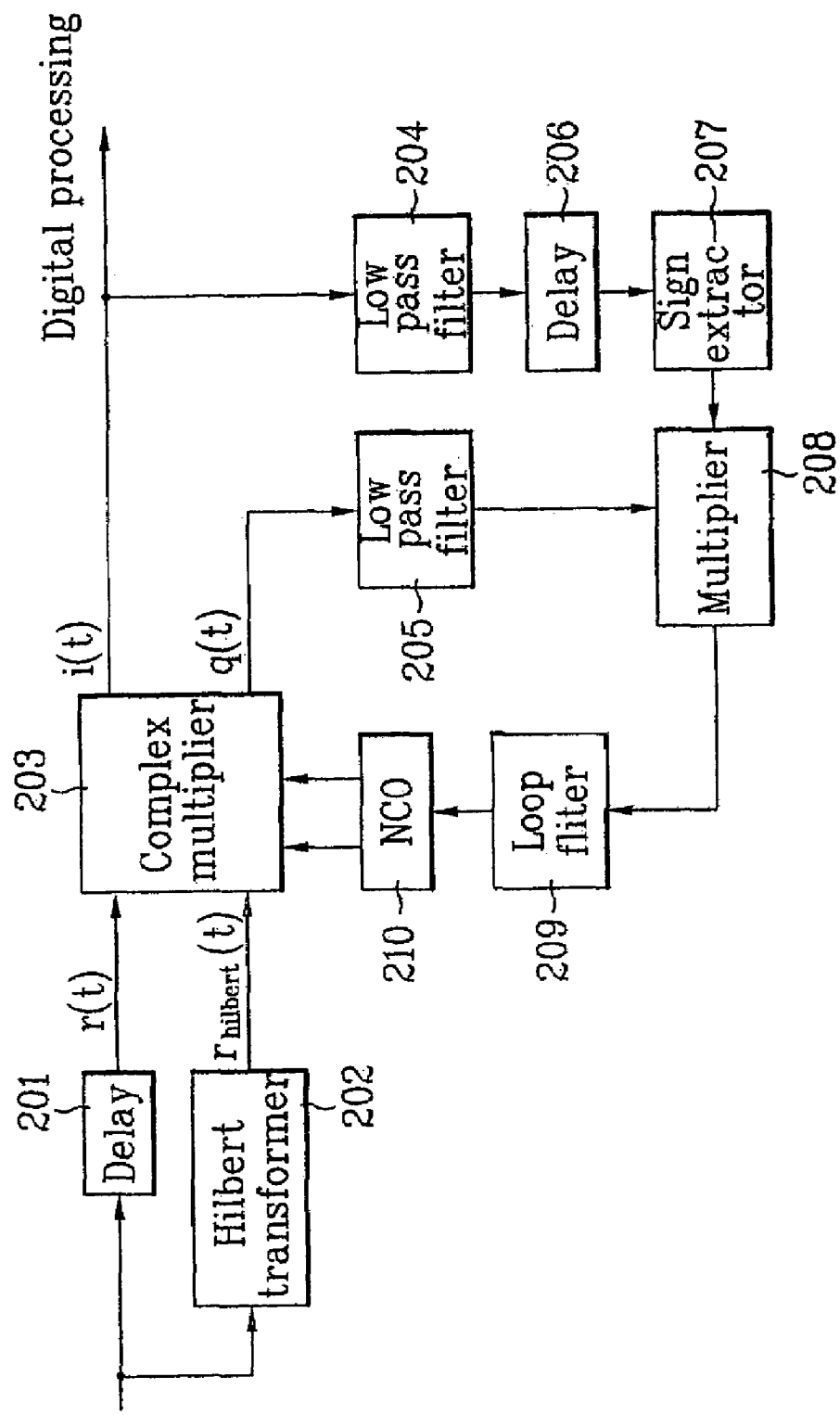
FIG. 2 illustrates a detailed block diagram of the carrier recoverer in FIG. 1.
Figures 3, 4:
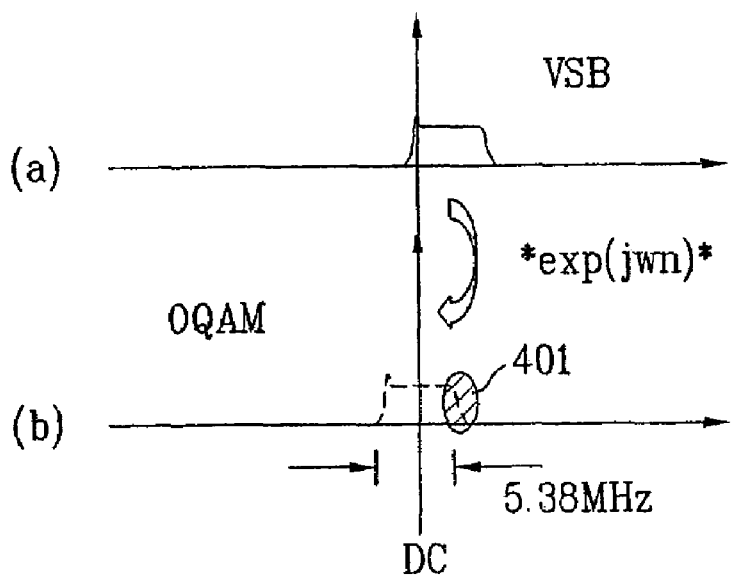
FIG. 3 illustrates a signal configuration when a VSB signal is subjected to a QAM modulation in accordance with a preferred embodiment of the present invention.
FIG. 4 illustrates a relation of a VSB signal and an OQAM signal in accordance with a preferred embodiment of the present invention.

If it is assumed that the VSB signal is digitized with a two fold sampling frequency at an A/D converter (105 in FIG. 1), as shown in FIG. 3($a$), an I signal of the VSB signal has an intermediate sample value XI present between two symbol samples I1 and I2. A Q signal of the VSB signal is a signal generated by inverting a phase of the I signal to 90° at a Hilbert transformer.

For modulating the VSB signal into the OQAM signal, a complex value exp(jwn) of a frequency is multiplied to the I signal and the Q signal of the VSB signal, where, 'w' denotes a modulation frequency, 2.69 MHz (i.e., $\pi/4$). The OQAM signal generated thus has a configuration as shown in FIG. 3($b$). As shown in FIG. 3($b$), if the I signal of the VSB signal, i.e., a signal having the symbol included therein is modulated into the OQAM signal, the symbol presents in real components and imaginary components of the OQAM signal, alternately. Samples of the OQAM signal having no symbols included therein, i.e., Yi (i=1, 2, 3, - - - ) are values generated by the intermediate sample, and the Q signal of the VSB signal.

FIG. 4 illustrates a relation of a VSB signal and an OQAM signal in a frequency domain in accordance with a preferred embodiment of the present invention, wherein the FIG. 4($a$) illustrates the VSB signal, and FIG. 4($b$) illustrates the OQAM signal.

The present invention suggests estimating a carrier phase error by using two kinds of values. One case uses complex components I1+jY1, Y4+jI2, - - - of the OQAM signal having symbols of the VSB signal included therein respectively, and the other case uses complex components Y2+jY3, Y5+jY6, - - - of the OQAM signal having no symbols of the VSB signal included therein.

There can be a variety of methods for estimating the carrier phase error by using components having symbols included therein respectively or by using components having no symbols included therein. Embodiments of the present invention will be described.

First Embodiment

Figure 5:
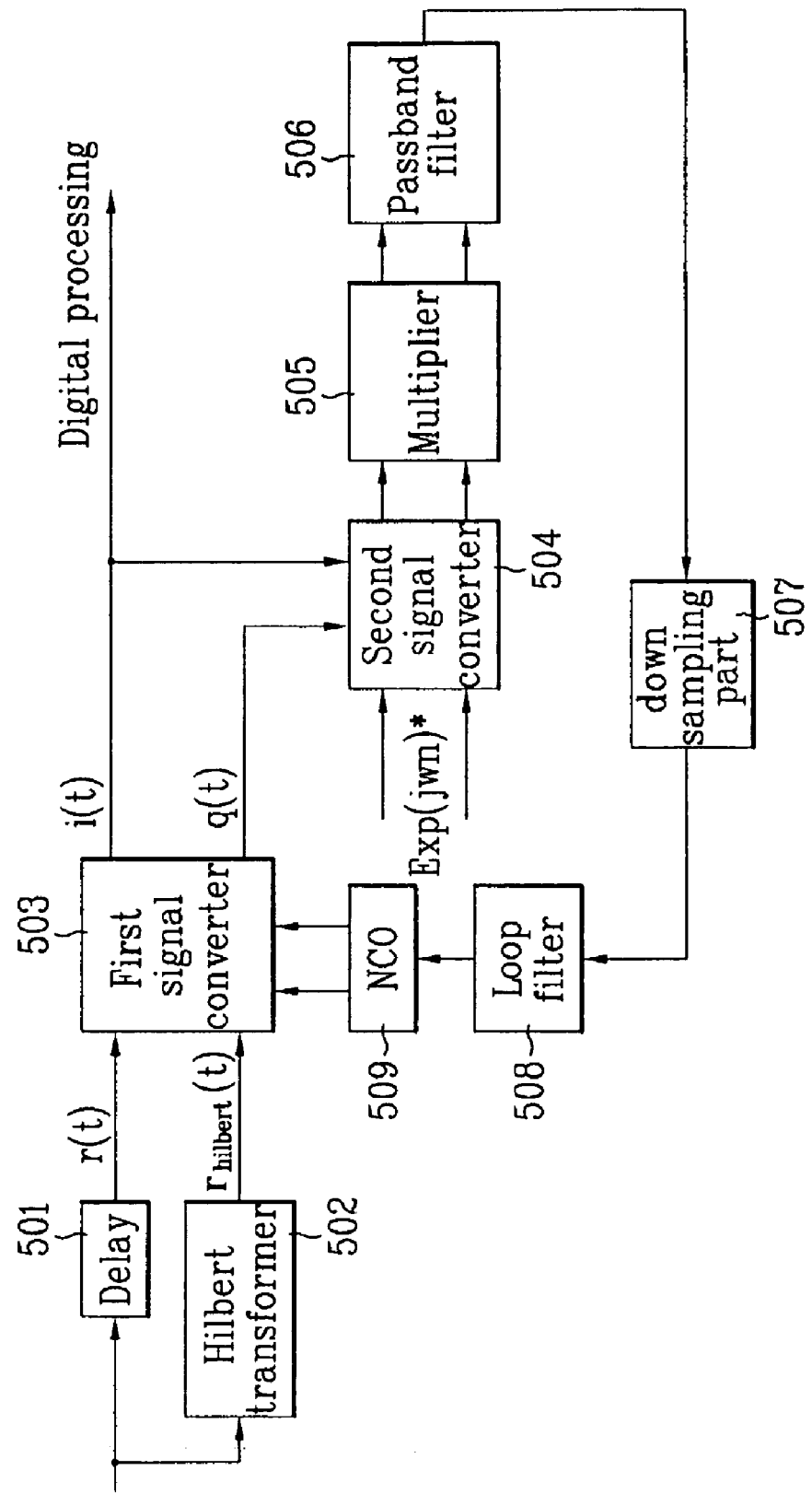
FIG. 5 illustrates a block diagram of a device for recovering a carrier in accordance with a first preferred embodiment of the present invention.

In the first embodiment, a real component I and an imaginary component Q of the OQAM signal are multiplied, for detecting a carrier phase error, of which system is illustrated in FIG. 5, in detail.

Referring to FIG. 5, a real component of a digitized VSB passband signal is provided both to a delay 501 and a Hilbert transformer 502. The Hilbert transformer 502 inverts the real component of the signal to 90° to modulate the real component of the signal into an imaginary component of the signal, and provides to a first signal converter 503. The delay 501 receives and delays the real component of the signal as long as a process time period at the Hilbert transformer 502, and provides to the first signal converter 503. The real component of the signal is called as an I channel signal, and the imaginary component of the signal is called as a Q channel signal.

The first signal converter 503 multiplies a complex carrier fed-back through an NCO 509 to the I channel signal, and the Q channel signal. The passband I and Q channel signals are converted into baseband I and Q channel signals at the first signal converter 503.

A second signal converter 504 multiplies a complex value of a frequency to the baseband I and Q signals from the first signal converter 503, to convert the baseband I and Q signals into an OQAM signal. The OQAM signal has a real component and an imaginary component each having a symbol of the VSB signal, and a real component and an imaginary component each having no symbol of the VSB signal.

The multiplier 505 receives the OQAM signal from the second signal converter 504, and multiplies a real component and an imaginary component of the OQAM signal. The value multiplied at the multiplier 505 is used for estimation of the carrier phase error. The calculated value includes a component representing a size of the carrier phase error and a component representing a direction of the carrier phase error.

A passband filter 506 passes a frequency component of a timing edge of the signal from the multiplier 505. The down sampling part 507 down samples, and transits the frequency component from the passband filer 506 to a DC position. The signal from the down sampling part 507 has a value for compensating for the carrier phase error.

The loop filter 508 filters and accumulates outputs from the down sampling part 507, and an NCO 509 generates a complex carrier proportional to the output from the loop filter 508 and provides to the first signal converter 503.

The foregoing first embodiment of the present invention falls on a case when the carrier phase error is estimated by using complex signals I1+jY1, Y4+jI2, - - - of the OQAM signal each having a symbol component of the VSB signal. A method for recovering a carrier in accordance with a first preferred embodiment of the present invention will be described in detail.

Referring to FIG. 4($b$), if the second signal converter 504 multiplies a complex value of a frequency exp(jwn) to VSB baseband I, Q signals from the first signal converter 503, the VSB signal is converted into an OQAM signal, as a frequency center of the VSB signal is shifted to a DC, where w=π/4. Then, the second signal converter 504 provides the complex signal only having the symbol of the VSB signal to the multiplier 504. If it is assumed that the signal provided to the multiplier 504 has the carrier phase error θ, the signal provided to the multiplier 504 can be expressed as the following equation (1).

$$(I1+jY1)(\exp j0)=(I1 \cos θ - Y1 \sin θ)+j(I1 \sin θ + Y1 \cos θ) \quad (1)$$

Where, (I1 cos θ−Y1 sin θ) is a real component Re, and (I1 sin θ+Y1 cos θ) is an imaginary component Im. The multiplier 505 multiplies the real component Re and the imaginary component Im, of which result is as the following equation (2).

$$Re \times Im = \frac{1}{2}(I1^2 - Y1^2)\sin 2θ + (I1 \times Y1)\cos 2θ \quad (2)$$

Referring to the equation (2), the signal from the multiplier 505 has two components. The component I1×Y1 is not so much required for estimation of the carrier phase error. However, by using $(I1^2 - Y1^2)\sin 2θ$, having nothing to do with the pilot component, the carrier phase error can be estimated. $(I1^2 - Y1^2)$ fixes a size of the carrier phase error, and sin 2θ fixes a direction of the carrier phase error. In this instance, if the carrier phase error θ is negative, sin 2θ is also negative, and vice versa. Therefore, for compensating for a direction of the carrier phase error, it is required that a phase of the carrier is shifted to a positive direction if the carrier phase error θ is negative, and a phase of the carrier is shifted to a negative direction if the carrier phase error θ is positive.

The multiplier 505 provides an output to the passband filter 506, and the pass band filter 506 filters frequency components of timing edges 401 of the signal from the multiplier 505, and provides to the down sampling part 507. The down sampling part 507 down samples an output from the passband filter 506, and provides only a signal of desired domain in a frequency domain to a loop filter 508.

In this instance, the timing edge 401 is present at a position of 2.69 MHz in the frequency domain in an ideal case. After the real component and the imaginary component of the OQAM signal are multiplied at the multiplier 505, the frequency component is formed with the timing edge, which is call as a tone, which is positioned at 5.38 MHz in an ideal case. Accordingly, the passband filer 506 passes the 5.38 MHz signal. Once filtered at the passband filter 506, and down sampled at the down sampling part 507, a signal of a desired frequency band can be obtained. The signal obtained at the down sampling part 507 is provided to the loop filter 508. The signal provided from the down sampling part 507 is the carrier phase error. The loop filter 508 filters, and accumulates outputs from the down sampling part 507, and provides to the NCO 509, and the NCO 509 generates a complex carrier proportional to an output from the loop filter 508, and provides to the first signal converter 503. Upon repeating the process, a carrier frequency signal almost similar to the carrier frequency component of the signal received from an exterior is generated at the NCO 503, and provided to the first signal converter 503, and the first signal converter 503 transits a passband VSB signal to a baseband VSB signal.

Second Embodiment

Figure 6:
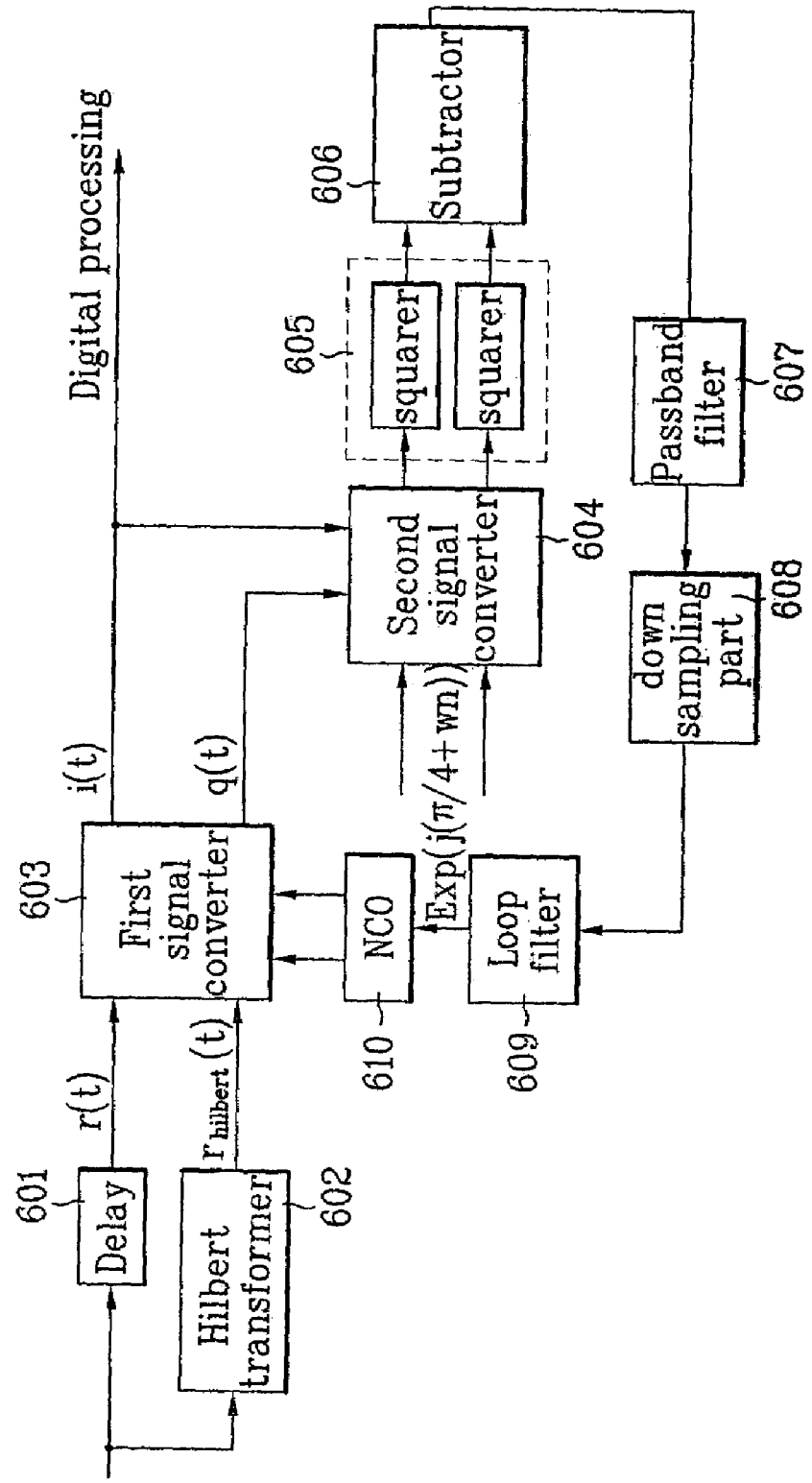
FIG. 6 illustrates a block diagram of a device for recovering a carrier in accordance with a second preferred embodiment of the present invention.

FIG. 6 illustrates a block diagram of a device for recovering a carrier in accordance with a second preferred embodiment of the present invention. In the second embodiment, a real component and an imaginary component of an OQAM signal are squared respectively, and the two squared values are used in estimating a carrier phase error.

Referring to FIG. 6, the device for recovering a carrier in accordance with a second preferred embodiment of the present invention includes a Hilbert transformer 602 for inverting a real component of a digitized VSB passband signal to 90°, to modulate into an imaginary component of a signal (a Q channel signal), a delay 601 for delaying a real component (an I channel signal) of the VSB signal as long as a process time period at the Hilbert transformer 602, a first signal converter 603 for multiplying the complex carrier fed back through an NCO to the I channel signal, and the Q channel signal, a second signal converter 604 for multiplying a complex value of a frequency to the baseband I and Q signals from the first signal converter 603, to convert the baseband I and Q signals into an OQAM signal, a squaring part 605 for respectively squaring a real component Re and an imaginary component Im of the OQAM signal from the second signal converter 604, a subtractor 606 for calculating a difference of the squared two values, a passband filter 607 for filtering a frequency component of the timing edges of a signal from the subtractor 606, a down sampling part 608 for down sampling a signal from the passband filter 607, a loop filter 609 for filtering and accumulating the signal from the down sampling part 608, and an NCO 610 for generating a complex carrier proportional to the signal from the loop filter 609.

The device for recovering a carrier in accordance with a second preferred embodiment of the present invention uses the squaring part 605 and the subtractor 606 instead of the multiplier in FIG. 5 in detecting a carrier phase error from an OQAM signal. The other parts of the system, i.e., the delay 601, the Hilbert transformer 602, the first signal converter 603, the passband filter 607, the down sampling part 608, the loop filter 609, and the NCO 610 have systems and operations identical to FIG. 5, but different reference symbols.

A case will be described as a preferred embodiment, when the carrier phase error is estimated by using complex signals Y2+jY3, Y5+jY6, - - - of an OQAM signal each having no symbol component of the VSB signal.

The second signal converter 604 multiplies a complex value exp(jwn) of a frequency to the VSB baseband I, Q signals from the first signal converter 603. The VSB I, Q signals converted into an OQAM signal at the second signal converter 604. The second signal converter 604 provides the complex signal Y2+jY3, Y5+jY6, - - - of the OQAM signal each having no symbol of the VSB signal to the squaring part 605. In this instance, if it is assumed that the carrier phase error θ is included in the signal provided to the squaring part 605, the signal provided to the squaring part 605 can be expressed as the following equation (3).

$$(Y2+jY3)(\exp j(\theta+\pi/4))=(Y2 \cos(\theta+\pi/4)-Y3 \sin(\theta+\pi/4))+j(Y2 \sin(\theta+\upsilon\pi/4)+Y3 \cos(\theta+\pi/4)) \quad (3)$$

Where, (Y2 cos(θ+π/4)−Y3 sin(θ+π/4)) is a real component Re, and (Y2 sin(θ+π/4)+Y3 cos(θ+π/4)) is an imaginary component Im. The squaring part 605 respectively squares the real component Re and the imaginary component Im. The subtractor 606 calculates a difference of the square of the real component Re and a square of the imaginary component Im, of which result is as the following equation (4).

$$Re^2-Im^2=(Y2^2-Y3^2)\sin 2(\theta+\pi/4)+2(Y2 \times Y3)\cos 2(\theta+\pi/4) \quad (4)$$

Referring to the equation (4), the signal from the squaring part 605 has two components. The component (Y2²−Y3²) is not so much required for estimation of the carrier phase error. However, by using (Y2×Y3), having nothing to do with the pilot component, the carrier phase error can be estimated. (Y2×Y3) fixes a size of the carrier phase error, and cos 2(θ+π/4) fixes a direction of the carrier phase error.

The subtractor 606 provides a signal to the passband filter 607, and the passband filter 607 filters frequency components of timing edges 401 of the difference of the square of the real component Re of the OQAM signal and the square of imaginary component Im of the OQAM signal Re2−Im2, and provides to the down sampling part 608.

Then, the down sampling part 608 down samples a signal from the passband filter 607, and provides only a signal of desired domain in a frequency domain to a loop filter 609.

The loop filter 609 filters, and accumulates signals from the down sampling part 608, and provides to the NCO 610, and the NCO 610 generates a complex carrier proportional to an output from the loop filter 609, and provides to the first signal converter 603.

Third Embodiment

Figure 7:
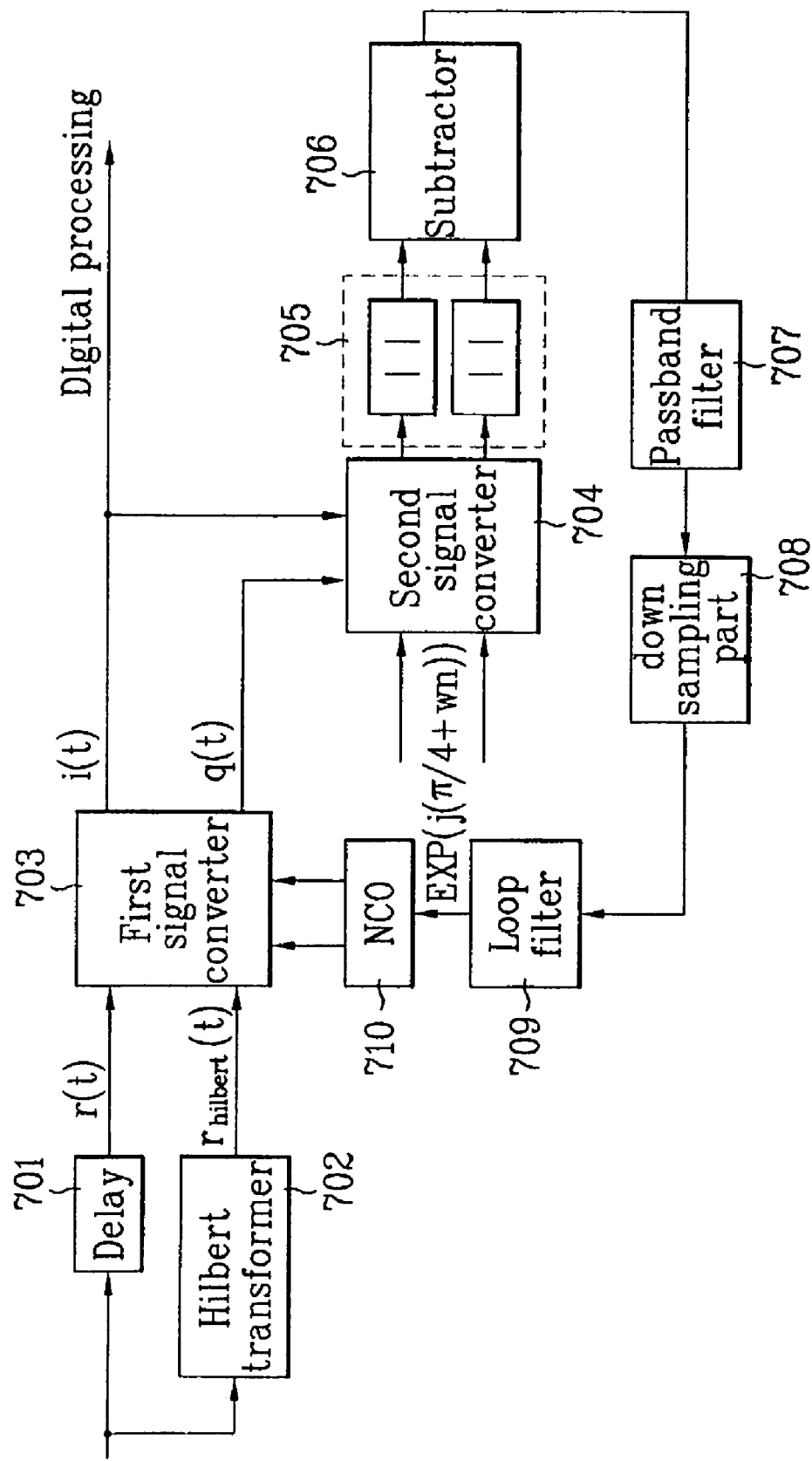
FIG. 7 illustrates a block diagram of a device for recovering a carrier in accordance with a third preferred embodiment of the present invention.

FIG. 7 illustrates a block diagram of a device for recovering a carrier in accordance with a third preferred embodiment of the present invention. In the third embodiment, absolute values of a real component and an imaginary component of an OQAM signal are calculated respectively, and a difference of the two absolute values are used in estimating a carrier phase error.

Referring to FIG. 7, the device for recovering a carrier in accordance with a third preferred embodiment of the present invention includes a Hilbert transformer 702 for inverting a real component of a digitized VSB passband signal to 90°, to modulate into an a carrier phase error by a complex signal of an OQAM signal having a symbol component of the VSB signal to one of the first to third embodiment, or a complex signal of an OQAM signal having no symbol component of the VSB signal to one of the first to third embodiment.

As has been explained, the device for recovering a carrier of the present invention can carry out recovery of carrier accurately by recovering the carrier by using an OQAM signal modulated from a VSB signal, thereby permitting an accurate recovery of the carrier even if the pilot is attenuated or become not detectable in a poor channel environment with many reflected waves, like a city center environment.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A device for recovering a carrier comprising:
   a first signal converter for multiplying a complex carrier caused by a phase error to a digitized passband VSB (vestigial sideband) signal, to provide a baseband VSB signal;
   a second signal converter for multiplying a complex value of a frequency to the signal from the first signal converter, to convert the baseband VSB signal into an OQAM (offset quadrature amplitude modulation) signal;
   an error estimating part for generating a signal having carrier phase error information by using a real component and an imaginary component of the OQAM signal; and
   an oscillator for generating the complex carrier according to the carrier phase error information.

2. The device as claimed in claim 1, wherein the error estimating part multiplies the real component and the imaginary component of the OQAM signal.

3. The device as claimed in claim 1, wherein the error estimating part respectively squares the real component and the imaginary component of the OQAM signal, and calculates a difference of a squared value of the real component and a squared value of the imaginary component.

4. The device as claimed in claim 1, wherein the error estimating part calculates absolute values of the real component and the imaginary component of the OQAM signal, and calculates a difference of absolute values of the real component and the imaginary component.

5. The device as claimed in claim 1, wherein the OQAM signal includes a symbol of the VSB signal in either one of the real component and the imaginary component.

6. The device as claimed in claim 1, wherein the OQAM signal includes no symbol of the VSB signal in neither of the real component and the imaginary component.

7. The device as claimed in claim 1, wherein the carrier phase error information is a frequency component of timing edges of the signal from the error estimating part.

8. A method for recovering a carrier comprising the steps of:
   (a) multiplying a digitized passband VSB (vestigial sideband) signal to a complex carrier caused by a phase error to convert the passband VSB signal into a baseband VSB signal;
   (b) multiplying a complex value of a frequency to the baseband VSB signal, to convert the baseband VSB signal to an OQAM (offset quadrature amplitude modulation) signal;
   (c) generating a signal including carrier phase error information by using a real component and an imaginary component of the OQAM signal; and
   (d) generating the complex carrier according to the carrier phase error information.

9. The method as claimed in claim 8, wherein the step (c) includes the step of multiplying the real component and the imaginary component of the OQAM signal.

10. The method as claimed in claim 8, wherein the step (c) includes the step of respectively squaring the real component and the imaginary component of the OQAM signal, and calculating a difference of squares of the real component and the imaginary component.

11. The method as claimed in claim 8, wherein the step (c) includes the step of respectively calculating absolute values of the real component and the imaginary component of the OQAM signal, and calculating a difference of absolute values of the real component and the imaginary component.

12. The method as claimed in claim 8, wherein the signal including the carrier phase error information is generated by using the real component and the imaginary component of the OQAM signal either one of which has a symbol of the VSB signal.

13. The method as claimed in claim 8, wherein the signal including the carrier phase error information is generated by using the OQAM signal having no symbol of the VSB signal.

14. A device for recovering a carrier comprising:
a first signal converter for multiplying a complex carrier caused by a phase error to a digitized passband VSB (vestigial sideband) signal, to provide a baseband VSB signal;
a second signal converter for multiplying a complex value of a frequency to the signal from the first signal converter, to convert the baseband VSB signal into an (offset quadrature amplitude modulation) OQAM signal;
an error estimating part for generating a signal having carrier phase error information by using a real component and an imaginary component of the OQAM signal;
a sampling part for sampling a signal from the error estimating part to shift the signal to a DC (direct current) position;
a filter for filtering, and accumulating the signal from the sampling part; and
an oscillator for generating the complex carrier according to a signal from the filter.

15. The device as claimed in claim 14, wherein the error estimating part is a multiplier for multiplying the real component and the imaginary component of the OQAM signal.

16. The device as claimed in claim 14, wherein the error estimating part includes;
a squaring part for respectively squaring the real component and the imaginary component of the OQAM signal, and
a subtractor for calculating a difference of a squared value of the real component and a squared value of the imaginary component.

17. The device as claimed in claim 14, wherein the error estimating part includes;
an absolute value calculating part for calculating absolute values of the real component and the imaginary component of the OQAM signal, and
a subtractor for calculating a difference of absolute values of the real component and the imaginary component.

18. The device as claimed in claim 14, wherein the sampling part samples a frequency component of timing edges of a signal from the error estimating part.

19. A method for recovering a carrier comprising the steps of:
(a) multiplying a digitized passband VSB (vestigial sideband) signal to a complex carrier caused by a phase error to convert the passband VSB signal into a baseband VSB signal;
(b) multiplying a complex value of a frequency to the baseband VSB signal, to convert the baseband VSB signal to an (offset quadrature amplitude modulation) OQAM signal;
(c) generating a signal including carrier phase error information by using a real component and an imaginary component of the OQAM signal;
(d) sampling a frequency component only having the carrier phase error information and shifting to a DC (direct current) position; and
(e) generating the complex carrier according to the sampled frequency component.

20. The method as claimed in claim 19, wherein the step (c) includes the step of multiplying the real component and the imaginary component of the OQAM signal.

21. The method as claimed in claim 19, wherein the step (c) includes the step of respectively squaring the real component and the imaginary component of the OQAM signal, and calculating a difference of squares of the real component and the imaginary component.

22. The method as claimed in claim 19, wherein the step (c) includes the step of respectively calculating absolute values of the real component and the imaginary component of the OQAM signal, and calculating a difference of absolute values of the real component and the imaginary component.

* * * * *